Sept. 18, 1962
J. R. BARR
3,054,975
SEAL FOR TRANSFORMER CASING AND METHOD
OF ASSEMBLING SAME
Filed Jan. 25, 1960
2 Sheets-Sheet 1
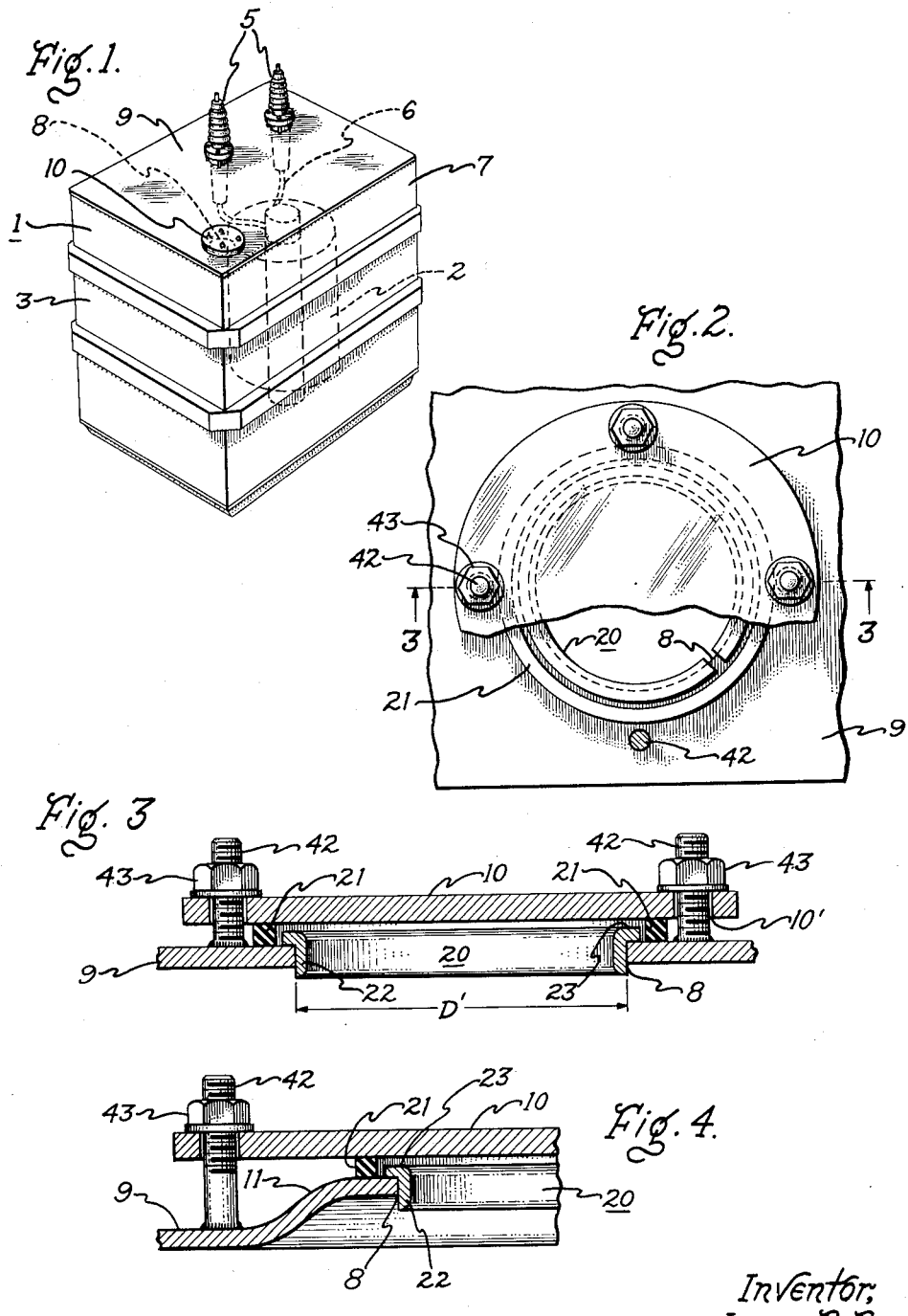
Inventor,
James R. Barr,
by Gilbert P. Tarleton
His Attorney.

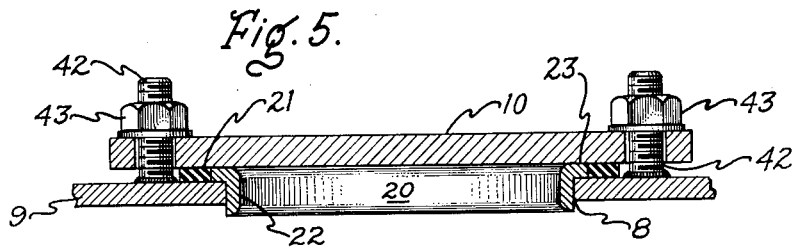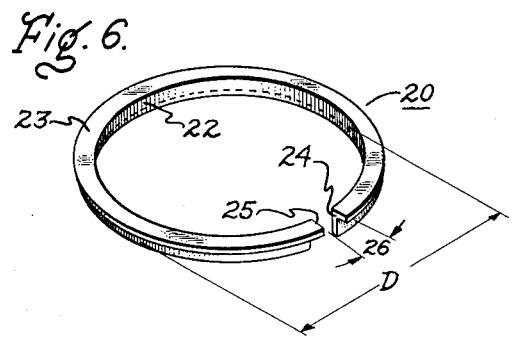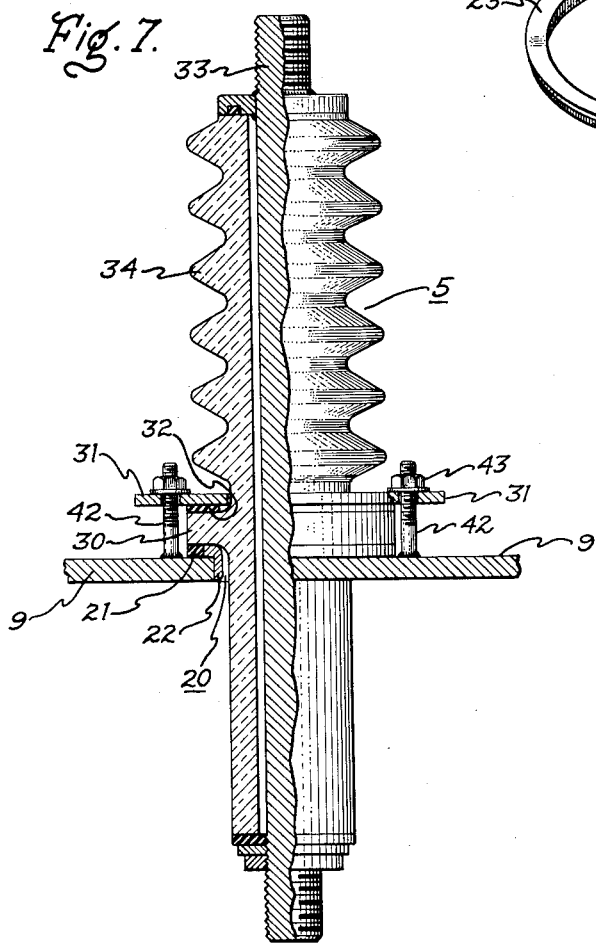

United States Patent Office 3,054,975
Patented Sept. 18, 1962

3,054,975
SEAL FOR TRANSFORMER CASING AND
METHOD OF ASSEMBLING SAME
James R. Barr, Rome, Ga., assignor to General Electric Company, a corporation of New York
Filed Jan. 25, 1960, Ser. No. 4,437
12 Claims. (Cl. 336—90)

The present invention relates to a seal construction, and more in particular to a fluid-tight gasketed joint and a method and means for making same.

In sealing openings in enclosures containing fluids it is common practice to form a joint by placing a deformable gasket around such openings and compressing the gasket with a joint member such as a cover plate. It has been found that when such gaskets are made of synthetic material, such as nitrile rubber, optimum gasket performance is obtained when the gasket is compressed from 25% to 45% of its original thickness. Compression greater than 45% causes the gasket to deteriorate rapidly, while compression less than 25% will not produce a reliable fluid-tight seal. Therefore, in this type of joint structure, means must be provided for insuring that the gasket is compressed in the optimum range. In this type of joint, problems also arise because means must be provided for positioning the gasket around the opening and also shielding the sharp or rough edges of the opening.

In the past, gasket compression stops of two general types have been employed in the above type of joint structure. One type of stop comprises a groove machined in one of the mating surfaces. The gasket rests in the groove, and compression of the gasket is limited when the surfaces of the mating joint members come into contact. This grooved type of joint possesses the disadvantage that if the mating members of the joint structure are relatively thin, it is often impossible to provide a groove in one or the other of them because the grooved member will be weakened beyond a tolerable limit. The other type of stop employs metal strips that are welded or otherwise attached to one or both of the mating surfaces to provide a channel for positioning the gasket and also limiting the compression thereof. If the opening around which the gasket is placed is relatively near an edge of one of the members, it is often impossible to weld a strip thereto because sufficient surface area is not available. Also, in certain circumstances, the member having the opening therein is curved so that portions thereof are not in a plane parallel to that of the other joint member. In this case it is virtually impossible to weld a strip to the curved surface. Both of the above types of gasket compression stops possess the additional disadvantages that they are extremely expensive and also very time-consuming to produce. Furthermore, neither of the above stops solves the problem of providing a shield for the rough or sharp edges of the opening that may cut the operator's hand or injure parts inserted or withdrawn from the opening; the shielding feature is also desirable where the joint is subject to electrical stresses because these stresses concentrate at sharp edges and points.

Accordingly, it is an object of this invention to provide a gasketed joint arrangement which avoids the disadvantages of the type mentioned above.

It is a further object of this invention to provide means for simultaneously positioning a gasket, limiting compression of the gasket to a desired range, and also shielding rough or sharp edges of an opening around which the gasket is placed.

It is a further object of this invention to provide a method of making a joint structure in which compression of a gasket around an opening is limited to a desired range, the gasket is positioned properly, and the edges of the opening are shielded.

Other objects and advantages of my invention will become apparent from the following description and appended claims.

The objects of my invention may be realized through the provision of means which extend into an opening in one joint member and also extend beyond the opening both radially and axially between opposing joint members.

The invention will be better understood from the following description taken in conjunction with the accompanying drawing, in which:

FIG. 1 is an isometric view of an embodiment of apparatus employing a joint structure in accordance with my invention.

FIG. 2 is an enlarged plan view of the joint illustrated in FIG. 1, with a portion of the cover plate broken away.

FIG. 3 is a cross-sectional view taken along the lines 3—3 of FIG. 2 with the gasket in the uncompressed state.

FIG. 4 is a cross-sectional view corresponding to FIG. 3 illustrating a modification of my improved joint structure.

FIG. 5 is a view corresponding to that in FIG. 3 with the gasket in the compressed state.

FIG. 6 is a partially cross-sectional view of another embodiment of joint structure in accordance with my invention.

FIG. 7 is an isometric view of an embodiment of means for practicing my invention.

Referring now to the drawing, and more in particular to FIG. 1, therein is illustrated an embodiment of apparatus in which my invention has been successfully employed. The apparatus illustrated in an electrical transformer 1 in which the core and winding, indicated in phantom at 2, are enclosed in a metal container or tank 3. Bushings 5 may be applied to the tank 3, and leads 6 may connect the winding to the bushings. Other conventional transformer accessories may also be applied to the transformer 1. According to conventional practice, the tank 3 may be filled with an insulating and cooling fluid 7, such as transformer oil or a dielectric gas. Since it is often necessary to gain access to the interior of the tank 3, for example to make minor repairs or replenish the fluid 7, an opening or aperture 8 may be provided in one side 9 of the tank. In order to provide a fluid-tight seal around the aperture 8, a gasketed joint structure, to be described in detail hereafter, may be provided between the side 9 and a lid or metal cover plate 10. It is intended that the reference to the above described electrical transformer is made for the purpose of illustration only, and that the invention is to be limited only by the scope of the appended claims.

Referring now to FIG. 2, a joint structure made in accordance with my invention is illustrated on an enlarged scale. The improved joint structure comprises a resilient element 20, to be described more in detail hereafter, which has been placed in the aperture 8. Deformable gasket means 21 is placed around the aperture 8 and properly positioned by the element 20. The cover plate 10 may then be applied over the aperture 8 and for compressing the gasket means 21 to a predetermined amount. The cover plate 10 and plate 9 thus form a pair of rigid cooperating joint members which may be held together by any suitable means. For example, a bolt 42 affixed to the side 9, may be passed through an aperture 10' in the cover plate, then suitable means such as screw threads and a nut 43 may be applied to the bolt 42 to hold the joint members together.

FIG. 3 illustrates my improved joint structure before the gasket means 21 has been compressed. It will be seen that the resilient element 20 is seated in the aperture 8 and has a side 22 extending into the aperture 8, and a side 23 which extends both axially beyond the aperture 8 and also radially beyond the aperture 8 between the joint members 9 and 10. Consequently, the sides 22 and 23 provide a shield for the rough or sharp edges of the aperture 28 because they are curved and relatively smooth. Also, because the side 23 extends radially beyond the aperture 8, it provides convenient means for positioning the gasket means 21 around the aperture. In this way, the gasket means 21 is positively located in a desired predetermined position around the aperture 8.

As illustrated in FIG. 4, the side 9 may have a portion thereof at 11 between the bolt 42 and aperture 8 curved away from the aperture 8 in order to drain water away from the aperture. This improves the joint structure by preventing liquids such as water from accumulating next to the gasket 21 and leaking into the container 3 if the joint becomes loose. The life of the gasket 21 will also be extended by thus keeping it out of contact with water or moisture.

Referring now to FIGURE 5, the nut 43 has been tightened on the bolt 42 thus forcing the cover plate 10 towards the side 9. This has caused compression of the gasket means 21. It will be seen that the side 23 of the element 20, because it extends axially beyond the aperture 8 between the members 9 and 10, has served as a stop means for limiting the extent of compression of the gasket means 21. Consequently, the compression of the gasket means 21 can be held to a predetermined range by varying the distance at which the side 23 extends axially beyond the aperture 8.

FIGURE 6 illustrates another embodiment of a joint structure in accordance with my invention. Instead of using a flat planar member, such as the cover plate 10, one joint member may comprise a flange 30 on a member, such as a conventional electrical bushing 5, which extends into the opening to be sealed. The flange 30 may be caused to compress the gasket 21 by a clamping ring 31, which is secured in place by a bolt 42 and nut 43 in the same manner as described above in regard to the embodiments of FIGS. 3–5. A pad 32 may be provided between the flange 30 and ring 31 to protect the bushing, which is conventionally porcelain, from the hard metallic surface of the ring. In all other respects the joint structure is the same as that of FIGS. 3 and 5.

Since the bushing 5 comprises an electrical conductor 33 which passes through a porcelain shell 34, it will be apparent that in the embodiment of FIG. 6 the joint members are subjected to unusually high electrical stresses. Consequently, it is vital that the sharp or rough edges of the opening in the member 9 be eliminated in order to prevent stress concentrations and resultant arcing. Consequently, by employing the resilient element 20 in which the sides 22 and 23 define a smooth rounded surface that serves as a shield for the edge of the opening, the necessity for rounding the edges of the opening is eliminated. Thus, in some embodiments of my invention the resilient element may serve as either an electrical shield, a mechanical shield, or both.

In FIGURE 7 the resilient element 20 is seen to comprise a unitary body of resilient material, such as aluminum or other metals, or resilient plastic materials. The ends 24 and 25 of the element 20 terminate short of each other so as to form a gap 26. The normal diameter D assumed by the element 20 is slightly larger than the diameter D' of the aperture 8. This enables the element 21 to be attached to the member 9 in the aperture 8 because of its inherent resiliency. This is accomplished by circumferentially compressing the element 20 until the ends 24 and 25 are brought into contact, thus closing the gap 26. In this state, the diameter of the compressed element 20 will be less than the diameter D' of the aperture 8. Consequently, the side 22 can be easily inserted into the aperture 8 and when the circumferential compression is released, the element 21 will try to expand to its normal diameter D because of its inherent resiliency. The surface of the aperture 8 will limit this expansion to a diameter no greater than the diameter D', and thus the element 20 will continue to try to expand and hold itself in position in the aperture 8. This will prevent the element 21 from becoming accidentally dislodged from its position in the aperture 8.

It is thus apparent that the scope of my invention also includes an improved method of making a gasketed joint structure. This method comprises the steps of circumferentially compressing the resilient element 20 to a diameter less than that of the aperture 8. The element 20 is then placed into the aperture 8 with the side 23 extending radially and axially beyond the aperture. The inherent resiliency of the element 20 is then allowed to expand same within the aperture 8. Next, the deformable gasket 21 is positioned around the side 23 of the element 20, and the joint member 10 is pressed against the gasket 21 deforming same until the side 23 limits the extent of compression of the gasket 21 to a predetermined range. The rough or sharp edge of the aperture 8 is shielded by the element 20. Finally, the joint members 9 and 10 are affixed together by any suitable arrangement, such as the nut 43 and bolt 42.

It has thus been shown that a joint structure according to my invention eliminates the inherent disadvantages of gasketed structures made according to past practices. In particular, my invention provides a joint structure in which the rough or sharp edge of an aperture is shielded, while at the same time gasket means is positioned around the aperture, and the extent of deformation of the gasket is limited to a predetermined amount. It will be readily apparent to one skilled in the art that by practicing my improved method or employing means according to my invention which extend between the joint members both axially and radially beyond the aperture, the above advantages can be achieved at a much lower cost than according to the prior practices in which a groove was machined in the surface of one joint member, or in which strips were welded to joint members to provide positioning means and stops.

While the present invention has been described with reference to particular embodiments thereof, it will be understood that numerous modifications may be made by those skilled in the art without actually departing from the scope of the invention. For example, it will be apparent that the inner or lower edge of the element 20 could also be made to extend radially beyond the aperture 8 so as to form a substantially U-shaped cross section for the element 20 without departing from the spirit and scope of the invention. Also, my invention is not to be limited to the illustrated embodiment of electrical apparatus, but may be practiced in any instance where a fluid-tight gasketed joint is desired. Therefore, the appended claims are intended to cover all such equivalent variations that come within the true spirit and scope of the invention.

What I claim as new and desire to secure by Letters Patent of the United States is:

1. A joint comprising a pair of rigid cooperating joint members, there being an opening in one of said members; compressible gasket means around said opening and between said joint members, said gasket means being compressed between said members to form a fluid-tight seal; opposed gasket contacting surfaces of said members being substantially smooth, flat and parallel; means extending axially into said opening, and both radially and axially beyond said opening between said members for simultaneously limiting the extent of compression of said gasket to a predetermined range, providing the only means positioning said gasket means around said opening, and also shielding the edge of said opening; and means holding said joint members together.

2. A joint as recited in claim 1 in which the last mentioned means for holding the joint members together comprises a bolt attached to one of said members and extending through an aperture in the other member, and a nut engaging threads on said bolt.

3. A joint as recited in claim 2 in which said one member which has the bolt attached thereto also has the opening therein, and said one member has the portion thereof between said opening and said bolt curved away from said opening.

4. The method of making a joint of the type in which a pair of rigid cooperating members compress a deformable gasket therebetween around an aperture in one of the members, comprising the steps of circumferentially compressing to a diameter less than that of said aperture a resilient element whose normal diameter is greater than that of said aperture, then placing the compressed element into said aperture, allowing the resiliency of said element to expand same within said aperture, positioning said deformable gasket around a portion of said element that extends radially beyond said aperture, moving the other of said joint members against said gasket and compressing same, limiting the extent of compression of said gasket by means of a portion of said element extending axially beyond said aperture, and affixing said joint members together.

5. A joint comprising a pair of rigid cooperating joint members, there being a circular aperture in one of said members, a unitary resilient circular element having one side inserted axially into said aperture and another side extending both axially and radially beyond said aperture between said joint members, means holding said joint members together, and a circular gasket between said joint members surrounding said element, said gasket being compressed between said joint members to form a fluid-tight seal, opposed gasket contacting surfaces of said members being substantially smooth, flat, and parallel, whereby the radially and axially extending side of said element both positions said gasket and provides a stop for limiting compression thereof, and the last-mentioned side and said one side shields the edge of said aperture.

6. In combination, a fluid container having an access opening therein, a lid covering said opening, and fluid-tight joint structure between said container and lid, said joint structure comprising means extending axially into said opening and both radially and axially beyond said opening between said container and lid, compressible gasket means between said container and lid surrounding the radial extension of said means, means holding said lid on said container, and said gasket means being compressed between said container and lid, opposed gasket contacting surfaces of said container and lid being substantially smooth, flat, and parallel, whereby the radial extension on said means positions said gasket means around said opening, the axial extension beyond said opening provides a stop for limiting compression of the gasket means, and said means also shields the edge of said opening.

7. The combination recited in claim 6 in which said access opening is circular and said means comprises a unitary resilient circular element having one side extending axially into said opening and another side extending both radially and axially beyond said opening between said container and lid.

8. An electrical transformer comprising a tank containing a core and winding, an insulating and cooling fluid in said tank, there being a circular access opening in said tank, a cover plate closing said access opening, and a fluid-tight joint structure between said tank and cover plate, said joint structure comprising a unitary circular resilient element having one side extending into said opening and another side extending both axially and radially beyond said opening between said tank and cover plate, a circular compressible gasket between said tank and cover plate surrounding the axially and radially extending side of said element, a bolt on said tank passing through an aperture in said cover plate and a nut threaded on said bolt holding said cover plate on said tank, and said gasket being compressed between said tank and cover plate by substantially flat, smooth, parallel surfaces thereof, whereby the last mentioned side of said element both positions said gasket and provides a stop for limiting compression of the gasket, and said element also shields the edge of said opening.

9. Apparatus as recited in claim 8 in which said element is circumferentially compressible, and has a normal diameter greater than that of said opening when it is disengaged therefrom, whereby after circumferential compression of said element to a diameter less than that of said opening, insertion of said one side into said opening and subsequent release of said circumferential compression, said element will expand into contact with the inside of said opening and dislodging thereof will be prevented by its inherent resiliency.

10. Apparatus as recited in claim 8 in which said tank in the area adjacent said access opening is curved upwardly so that the portion thereof defining said access opening is raised above the plane of the remainder of the tank, whereby liquids will be drained away from the opening.

11. An electrical transformer comprising a tank containing a core and winding, an insulating and cooling fluid in said tank, there being a circular opening in said tank, an electrical bushing having a flange extending radially therefrom extending into said opening with said flange closing the opening, and a fluid-tight joint structure between said tank and flange, said joint structure comprising a unitary circular resilient element having one side extending into said opening and another side extending both axially and radially beyond said opening between said tank and flange, said sides defining a smooth rounded surface, a circular compressible gasket between said tank and flange surrounding the axially and radially extending side of said element, a clamping ring bearing against said flange on the side opposite said tank, a bolt on said tank passing through an aperture in said clamping ring, and a nut threaded on said bolt holding said ring on said flange, and said gasket being compressed between said tank and flange by substantially flat, smooth, parallel opposed surfaces thereof, whereby the last mentioned side of said element both positions said gasket and provides a stop for limiting compression of the gasket, and the rounded surface of said element also shields the edge of said opening.

12. A joint comprising a pair of rigid cooperating joint member, there being an opening of given diameter in one of said members; compressible gasket means around said opening and between said joint members, said gasket means being compressed between said members to form a fluid tight seal; circumferentially compressible resilient means having a normal diameter greater than the diameter of said opening being in a state of circumferential compression in said opening said compressible means extending axially into said opening in both radially and axially beyond said opening between said members for simultaneously positioning said gasket means around said opening, limiting the extent of compression of said gasket to a predetermined range, and also shielding the edge of said opening; and means holding said joint members together.

References Cited in the file of this patent

UNITED STATES PATENTS

| | | |
|---|---|---|
| 1,572,404 | Mershon | Feb. 9, 1926 |
| 2,268,060 | Rhode | Dec. 30, 1941 |
| 2,284,530 | Myer | May 26, 1942 |
| 2,470,886 | Buzzell | May 24, 1949 |
| 2,597,596 | Reid | May 20, 1952 |
| 2,735,575 | Lehman | Feb. 21, 1956 |
| 2,809,228 | Dutton | Oct. 8, 1957 |
| 2,846,495 | Link | Aug. 5, 1958 |
| 2,922,542 | Barr | Jan. 26, 1960 |
| 2,924,636 | Broderick et al. | Feb. 9, 1960 |